US011392821B2

(12) United States Patent
Rafey

(10) Patent No.: US 11,392,821 B2
(45) Date of Patent: Jul. 19, 2022

(54) DETECTING BEHAVIOR PATTERNS UTILIZING MACHINE LEARNING MODEL TRAINED WITH MULTI-MODAL TIME SERIES ANALYSIS OF DIAGNOSTIC DATA

(71) Applicant: Dell Products L.P., Round Rock, TX (US)

(72) Inventor: Mohammad Rafey, Bangalore (IN)

(73) Assignee: Dell Products L.P., Round Rock, TX (US)

(*) Notice: Subject to any disclaimer, the term of this patent is extended or adjusted under 35 U.S.C. 154(b) by 288 days.

(21) Appl. No.: 16/877,631

(22) Filed: May 19, 2020

(65) Prior Publication Data
US 2021/0365762 A1    Nov. 25, 2021

(51) Int. Cl.
*G06G 7/00* (2006.01)
*G06N 3/04* (2006.01)
*G06K 9/62* (2022.01)
*G16Y 40/10* (2020.01)

(52) U.S. Cl.
CPC ......... *G06N 3/0445* (2013.01); *G06K 9/6223* (2013.01); *G06K 9/6256* (2013.01); *G06K 9/6269* (2013.01); *G16Y 40/10* (2020.01)

(58) Field of Classification Search
CPC ...... G06N 3/0445; G06N 3/08; G06K 9/6223; G06K 9/6256; G06K 9/6269; G06K 9/00523; G06K 9/00536; G06K 9/6271; G06K 9/6232; G16Y 40/10
USPC .......................................................... 706/20
See application file for complete search history.

(56) References Cited

U.S. PATENT DOCUMENTS

| | | | |
|---|---|---|---|
| 9,672,497 B1* | 6/2017 | Lewis | G06F 40/284 |
| 2011/0099158 A1* | 4/2011 | Magnuson | G06Q 10/04 |
| | | | 707/E17.108 |
| 2021/0097370 A1* | 4/2021 | Agnihotram | G06N 3/049 |

OTHER PUBLICATIONS

Amazon Web Services, "Amazon Kinesis," https://aws.amazon.com/kinesis/?hp=tile&so-exp=below, Mar. 17, 2020, 12 pages.
(Continued)

Primary Examiner — Charlotte M Baker
(74) Attorney, Agent, or Firm — Ryan, Mason & Lewis, LLP

(57) ABSTRACT

An apparatus includes a processing device configured to obtain time series diagnostic data associated with assets in an information technology (IT). The processing device is also configured to generate first modality information comprising behavior labels assigned to each of a plurality of time periods, a given behavior label for a given time period being based at least in part on measured feature values for the features collectively in the given time period. The processing device is further configured to generate second modality information comprising feature deltas characterizing differences between measured feature values for interdependent feature pairs. The processing device is further configured to perform multi-modal analysis of the time series diagnostic data to detect behavior patterns in the utilizing a machine learning model trained using the first modality information and the second modality information, and to initiate remedial action in the IT infrastructure responsive to detecting an anomalous behavior pattern.

20 Claims, 15 Drawing Sheets

(56) References Cited

OTHER PUBLICATIONS

J. L. Lobo, "Detecting Real-Time and Unsupervised Anomalies in Streaming Data: A Starting Point," https://towardsdatascience.com/detecting-real-time-and-unsupervised-anomalies-in-streaming-data-a-starting-point-760a4bacbdf8, Jan. 10, 2020, 7 pages.
S. Chatterjee, "Real-Time Streaming and Anomaly Detection Pipeline on AWS," https://towardsdatascience.com/real-time-streaming-and-anomaly-detection-pipeline-on-aws-cbd0bef6f20e, Feb. 25, 2019, 16 pages.
A. Gelman et al., "Missing-Data Imputation," Data Analysis Using Regression and Multilevel/Hierarchical Models, Cambridge University Press, 2007, pp. 529-543.
S. Topuz, "Real Time Anomaly Detection with AWS," https://towardsdatascience.com/real-time-anomaly-detection-with-aws-c237db9eaa3f, May 27, 2019, 9 pages.
W. Badr, "6 Different Ways to Compensate for Missing Values in a Dataset (Data Imputation with Examples)" https://towardsdatascience.com/6-different-ways-to-compensate-for-missing-values-data-imputation-with-examples-6022d9ca0779, Jan. 5, 2019, 8 pages.
Dell, "Dell IoT Solutions," https://www.dell.com/learn/us/en/555/oem/oem-internet-of-things, Accessed May 12, 2020, 2 pages.
Dell Technologies, "Edge Computing and IoT: Driving Analytics to the Edge," https://www.delltechnologies.com/en-in/solutions/internet-of-things/index.htm, Accessed May 12, 2020, 12 pages.

* cited by examiner

| DATE/TIME STAMP | FEATURE 1 | FEATURE 2 | FEATURE 3 | FEATURE 4 | FEATURE 5 | FEATURE 6 | CLASS LABEL |
|---|---|---|---|---|---|---|---|
| 1/11/2016 15:12 | 5454 | 432 | 432 | 234 | 6767 | 234 | 1 |
| 1/12/2016 15:12 | 3434 | 354 | 354 | 234 | 5454 | 656 | -1 |
| 1/13/2016 15:12 | 2333 | 234 | 234 | 432 | 3434 | 876 | 1 |
| 1/14/2016 15:12 | 454 | 5454 | 4343 | 354 | 2333 | 345 | 1 |
| 1/15/2016 15:12 | 23 | 234 | 2333 | 234 | 432 | 234 | 1 |
| 1/16/2016 15:12 | 432 | 5454 | 876 | 767 | 354 | 5454 | 1 |
| 1/17/2016 15:12 | 354 | 5454 | 345 | 8787 | 234 | 3434 | 1 |
| 1/18/2016 15:12 | 234 | 3434 | 234 | 2323 | 5454 | 6767 | 1 |
| 1/19/2016 15:12 | 656 | 6767 | 5454 | 5454 | 234 | 6767 | -1 |
| 1/20/2016 15:12 | 876 | 354 | 5454 | 344 | 5454 | 5454 | 1 |
| 1/21/2016 15:12 | 345 | 234 | 3434 | 2123 | 876 | 3434 | 1 |
| 1/22/2016 15:12 | 234 | 876 | 2333 | 1223 | 345 | 2333 | -1 |
| 1/23/2016 15:12 | 5454 | 345 | 432 | 677 | 234 | 876 | -1 |
| 1/24/2016 15:12 | 3434 | 234 | 354 | 345 | 6767 | 345 | 1 |
| 1/25/2016 15:12 | 3434 | 876 | 234 | 6767 | 5454 | 234 | 1 |
| 1/26/2016 15:12 | 432 | 345 | 5454 | 8765 | 3434 | 5454 | 1 |
| 1/27/2016 15:12 | 354 | 234 | 656 | 876 | 2333 | 6767 | 1 |
| 1/29/2016 15:12 | 234 | 5454 | 876 | 987 | 432 | 5454 | 1 |
| 1/30/2016 15:12 | 5454 | 432 | 345 | 234 | 354 | 3434 | 1 |
| 1/31/2016 15:12 | 3434 | 354 | 234 | 234 | 234 | 2333 | 1 |

| DATE/TIME STAMP | ΔA = (F1 - F2) | ΔB = (F1 - F4) | ΔC = (F1 - F6) | ΔD = (F2 - F4) | ΔE = (F2 - F5) | ΔF = (F2 - F6) | ΔG = (F3 - F2) |
|---|---|---|---|---|---|---|---|
| 1/11/2016 15:12 | 5220 | 5220 | 198 | -6335 | 198 | 0 | 5220 |
| 1/12/2016 15:12 | 3200 | 2778 | 120 | -5100 | -302 | 0 | 3200 |
| 1/13/2016 15:12 | 1901 | 1457 | -198 | -3200 | -642 | 0 | 1901 |
| 1/14/2016 15:12 | 100 | 109 | 5100 | 3121 | 5109 | -1111 | 100 |
| 1/15/2016 15:12 | -211 | -211 | 0 | -198 | 0 | 2099 | -211 |
| 1/16/2016 15:12 | -335 | -5022 | 4687 | 5100 | 0 | -4578 | -335 |
| 1/17/2016 15:12 | -8433 | -3080 | -3333 | 5220 | 2020 | -5109 | -8433 |
| 1/18/2016 15:12 | -2089 | -6533 | 1111 | -2020 | -3333 | -3200 | -2089 |
| 1/19/2016 15:12 | -4798 | -6111 | 1313 | 6533 | 0 | -1313 | -4798 |
| 1/20/2016 15:12 | 532 | -4578 | 10 | -5100 | -5100 | 5100 | 532 |
| 1/21/2016 15:12 | -1778 | -3089 | -1889 | -642 | -3200 | 3200 | -1778 |
| 1/22/2016 15:12 | -989 | -2099 | -347 | 531 | -1457 | 1457 | -989 |
| 1/23/2016 15:12 | 4777 | 4578 | -332 | 111 | -531 | 87 | 4777 |
| 1/24/2016 15:12 | 3089 | 3089 | -111 | -6533 | -111 | 120 | 3089 |
| 1/25/2016 15:12 | -3333 | 3200 | -5891 | -4578 | 642 | -642 | -3333 |
| 1/26/2016 15:12 | -8333 | -5022 | -8420 | -3089 | -5109 | 5109 | -8333 |
| 1/27/2016 15:12 | -522 | -6413 | -642 | -2099 | -6533 | 422 | -522 |
| 1/29/2016 15:12 | -753 | -5220 | 4467 | 5022 | 0 | -4578 | -753 |
| 1/30/2016 15:12 | 5220 | 2020 | 198 | 78 | -3002 | -87 | 5220 |
| 1/31/2016 15:12 | 3200 | 1101 | 120 | 120 | -1979 | -120 | 3200 |

| DATE/TIME STAMP | ΔH = (F3 - F4) | ΔI = (F3 - F5) | ΔJ = (F3 - F6) | ΔK = (F4 - F1) | ΔL = (F4 - F3) | ΔM = (F5 - F1) |
|---|---|---|---|---|---|---|
| 1/11/2016 15:12 | 198 | -6335 | 198 | -5220 | -198 | 1313 |
| 1/12/2016 15:12 | 120 | -5100 | -302 | -3200 | -120 | 2020 |
| 1/13/2016 15:12 | -198 | -3200 | -642 | -1901 | 198 | 1101 |
| 1/14/2016 15:12 | 3989 | 2010 | 3998 | -100 | -3989 | 1879 |
| 1/15/2016 15:12 | 2099 | 1901 | 2099 | 211 | -2099 | 409 |
| 1/16/2016 15:12 | 109 | 522 | -4578 | 335 | -109 | -78 |
| 1/17/2016 15:12 | -8442 | 111 | -3089 | 8433 | 8442 | -120 |
| 1/18/2016 15:12 | -2089 | -5220 | -6533 | 2089 | 2089 | 5220 |
| 1/19/2016 15:12 | 0 | 5220 | -1313 | 4798 | 0 | -422 |
| 1/20/2016 15:12 | 5110 | 0 | 0 | -532 | -5110 | 4578 |
| 1/21/2016 15:12 | 1311 | 2558 | 0 | 1778 | -1311 | 531 |
| 1/22/2016 15:12 | 1110 | 1988 | 0 | 989 | -1110 | 111 |
| 1/23/2016 15:12 | -245 | 198 | -444 | -4777 | 245 | -5220 |
| 1/24/2016 15:12 | 9 | -6413 | 9 | -3089 | -9 | 3333 |
| 1/25/2016 15:12 | -6533 | -5220 | 0 | 3333 | 6533 | 2020 |
| 1/26/2016 15:12 | -3311 | 2020 | 0 | 8333 | 3311 | 3002 |
| 1/27/2016 15:12 | -220 | -1677 | -6111 | 522 | 220 | 1979 |
| 1/29/2016 15:12 | -111 | 444 | -4578 | 753 | 111 | 198 |
| 1/30/2016 15:12 | 111 | -9 | -3089 | -5220 | -111 | -5100 |
| 1/31/2016 15:12 | 0 | 0 | -2099 | -3200 | 0 | -3200 |

| DATE/TIME STAMP | ΔN = (F5 - F3) | ΔO = (F5 - F4) | ΔP = (F5 - F6) | ΔQ = (F6 - F1) | ΔR = (F6 - F3) | ΔS = (F6 - F5) |
|---|---|---|---|---|---|---|
| 1/11/2016 15:12 | 6335 | 6533 | 6533 | -5220 | -198 | -6533 |
| 1/12/2016 15:12 | 5100 | 5220 | 4798 | -2778 | 302 | -4798 |
| 1/13/2016 15:12 | 3200 | 3002 | 2558 | -1457 | 642 | -2558 |
| 1/14/2016 15:12 | -2010 | 1979 | 1988 | -109 | -3998 | -1988 |
| 1/15/2016 15:12 | -1901 | 198 | 198 | 211 | -2099 | -198 |
| 1/16/2016 15:12 | -522 | -413 | -5100 | 5022 | 4578 | 5100 |
| 1/17/2016 15:12 | -111 | -8553 | -3200 | 3080 | 3089 | 3200 |
| 1/18/2016 15:12 | 5220 | 3131 | -1313 | 6533 | 6533 | 1313 |
| 1/19/2016 15:12 | -5220 | -5220 | -6533 | 6111 | 1313 | 6533 |
| 1/20/2016 15:12 | 0 | 5110 | 0 | 4578 | 0 | 0 |
| 1/21/2016 15:12 | -2558 | -1247 | -2558 | 3089 | 0 | 2558 |
| 1/22/2016 15:12 | -1988 | -878 | -1988 | 2099 | 0 | 1988 |
| 1/23/2016 15:12 | -198 | -443 | -642 | -4578 | 444 | 642 |
| 1/24/2016 15:12 | 6413 | 6422 | 6422 | -3089 | -9 | -6422 |
| 1/25/2016 15:12 | 5220 | -1313 | 5220 | -3200 | 0 | -5220 |
| 1/26/2016 15:12 | -2020 | -5331 | -2020 | 5022 | 0 | 2020 |
| 1/27/2016 15:12 | 1677 | 1457 | -4434 | 6413 | 6111 | 4434 |
| 1/29/2016 15:12 | -444 | -555 | -5022 | 5220 | 4578 | 5022 |
| 1/30/2016 15:12 | 9 | 120 | -3080 | -2020 | 3089 | 3080 |
| 1/31/2016 15:12 | 0 | 0 | -2099 | -1101 | 2099 | 2099 |

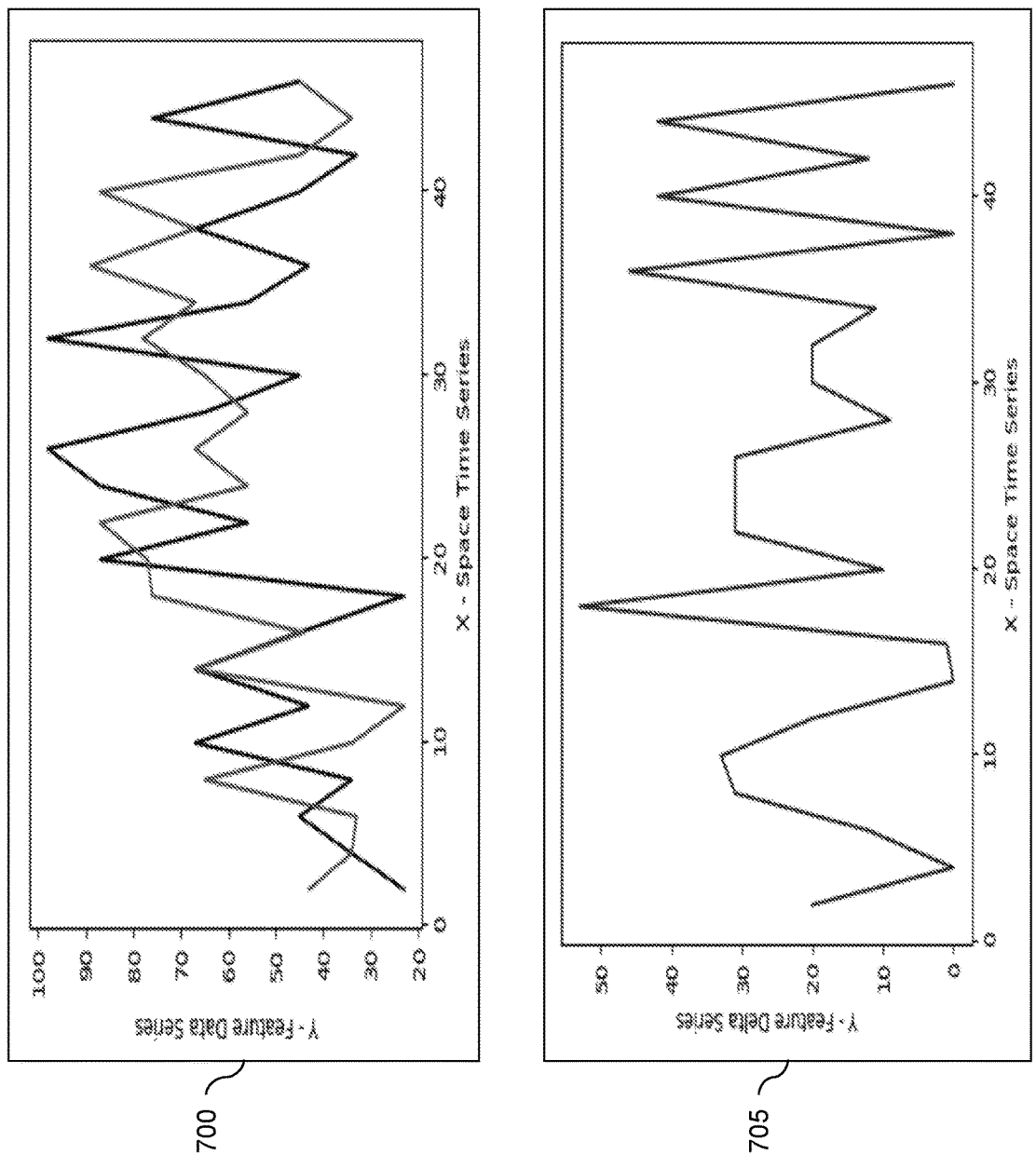

```
import pandas as pd
import numpy as np
from os import listdir
import matplotlib.pyplot as plt
import tensorflow as tf
from sklearn.metrics import accuracy_score
from keras.preprocessing import sequence
from keras.models import Sequential
from keras.layers import Dense
from keras.layers import LSTM
from keras.optimizers import Adam
from keras.models import load_model
from keras.callbacks import ModelCheckpoint
```

"""1. Collect IoT stream data in some periodic time interval, and prepare initial data set. In example below, "IoT-Data-Stream-1, ..., n" represents data collected per minute. The following code consolidates this into one sequence."""
path = 'sample-iot-data/IoT-Data-Stream-'
sequences = list()

```
for i in range(1, 5):
    file_path = path + str(i) + '.csv'
    print(file_path)
    df = pd.read_csv(file_path, header=0)
    values = df.values
    sequences.append(values)
```

"""2. Prepare the training data set."""
targets = pd.read_csv('sample-iot-data/IoT-Data-Sample-Traning-Set-1.csv')
targets = targets.values[:,1]

FIG. 9A

*"3. Take out a chunk of data for building the training data set. In the example below, an arbitrary number of records is used. In other applications, the number of records may be some pre-defined percentage, such as 20% of the entire data set."*

```
train = [sequences[i] for i in range(1, 500)]
validation = [sequences[i] for i in range(1, 500)]
test = [sequences[i] for i in range(1, 500)]

train_target = [targets[i] for i in range(1, 500)]
validation_target = [targets[i] for i in range(1, 500)]
test_target = [targets[i] for i in range(1, 500)]
```

*"4. Build training, validation and test data sets."*

```
train = np.array(train)
validation = np.array(validation)
test = np.array(test)

train_target = np.array(train_target)
train_target = (train_target+1)/2
validation_target = np.array(validation_target)
validation_target = (validation_target+1)/2 test_target = np.array(test_target)
test_target = (test_target+1)/2
```

```
"""5. Model training."""
model = Sequential()
# Sequence length is 2000 in this example.  In other applications, the value may depend on the length of the entire data set.
model.add(LSTM(256, input_shape=(2000, 4)))
model.add(Dense(1, activation='sigmoid'))
adam = Adam(lr=0.001)
chk = ModelCheckpoint('best_model.pkl', monitor='val_acc', save_best_only=True, mode='max', verbose=1)
model.compile(loss='binary_crossentropy', optimizer=adam, metrics=['accuracy'])
model.fit(train, train_target, epochs=200, batch_size=128, callbacks=[chk], validation_data=(validation,validation_target))

"""Loading the model and execute on test data."""
model = load_model('best_model.pkl')
test_preds = model.predict_classes(test)
accuracy_score(test_target, test_preds)
```

FIG. 9C

DETECTING BEHAVIOR PATTERNS UTILIZING MACHINE LEARNING MODEL TRAINED WITH MULTI-MODAL TIME SERIES ANALYSIS OF DIAGNOSTIC DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to techniques for monitoring information processing systems.

BACKGROUND

An information technology (IT) infrastructure may be monitored using various devices, such as Internet of Things (IoT) devices. IoT devices may include sensors that are deployed in the IT infrastructure to collect various types of data that is processed to monitor the IT infrastructure. For example, the IoT devices may collect various metrics that characterize state of the IoT devices and the environment in which the IoT devices operate. As the number of IoT devices deployed increases, it is more difficult to handle the volume of collected data to provide accurate and reliable monitoring of the IT infrastructure.

SUMMARY

Illustrative embodiments of the present invention provide techniques for detecting behavior patterns utilizing a machine learning model trained based at least in part on multi-modal time series analysis of diagnostic data.

In one embodiment, an apparatus comprises at least one processing device comprising a processor coupled to a memory. The at least one processing device is configured to perform the step of obtaining time series diagnostic data associated with a plurality of assets in an information technology infrastructure, the time series diagnostic data comprising feature values for a plurality of features measured for a plurality of time periods. The at least one processing device is also configured to perform the step of generating first modality information for the time series diagnostic data, the first modality information comprising behavior labels assigned to each of the plurality of time periods, a given behavior label for a given one of the plurality of time periods being based at least in part on measured feature values for the plurality of features collectively in the given time period. The at least one processing device is further configured to perform the step of generating second modality information for the time series diagnostic data, the second modality information comprising feature deltas characterizing differences between measured feature values for interdependent pairs of the plurality of features in each of the plurality of time periods. The at least one processing device is further configured to perform the steps of performing multi-modal analysis of the time series diagnostic data to detect behavior patterns in the time series diagnostic data utilizing a machine learning model trained using the first modality information and the second modality information, and initiating at least one remedial action in the information technology infrastructure responsive to detecting an anomalous behavior pattern in the time series diagnostic data.

These and other illustrative embodiments include, without limitation, methods, apparatus, networks, systems and processor-readable storage media.

BRIEF DESCRIPTION OF THE DRAWINGS

FIG. 5 shows generation of a binary classification model in an illustrative embodiment.

FIGS. 6A-6C show generation of a feature delta model in an illustrative embodiment.

FIG. 7 shows plots illustrating the feature delta model in an illustrative embodiment.

FIGS. 9A-9C show pseudocode for implementing a deep learning model for identifying anomalous behavior in IoT data streams in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
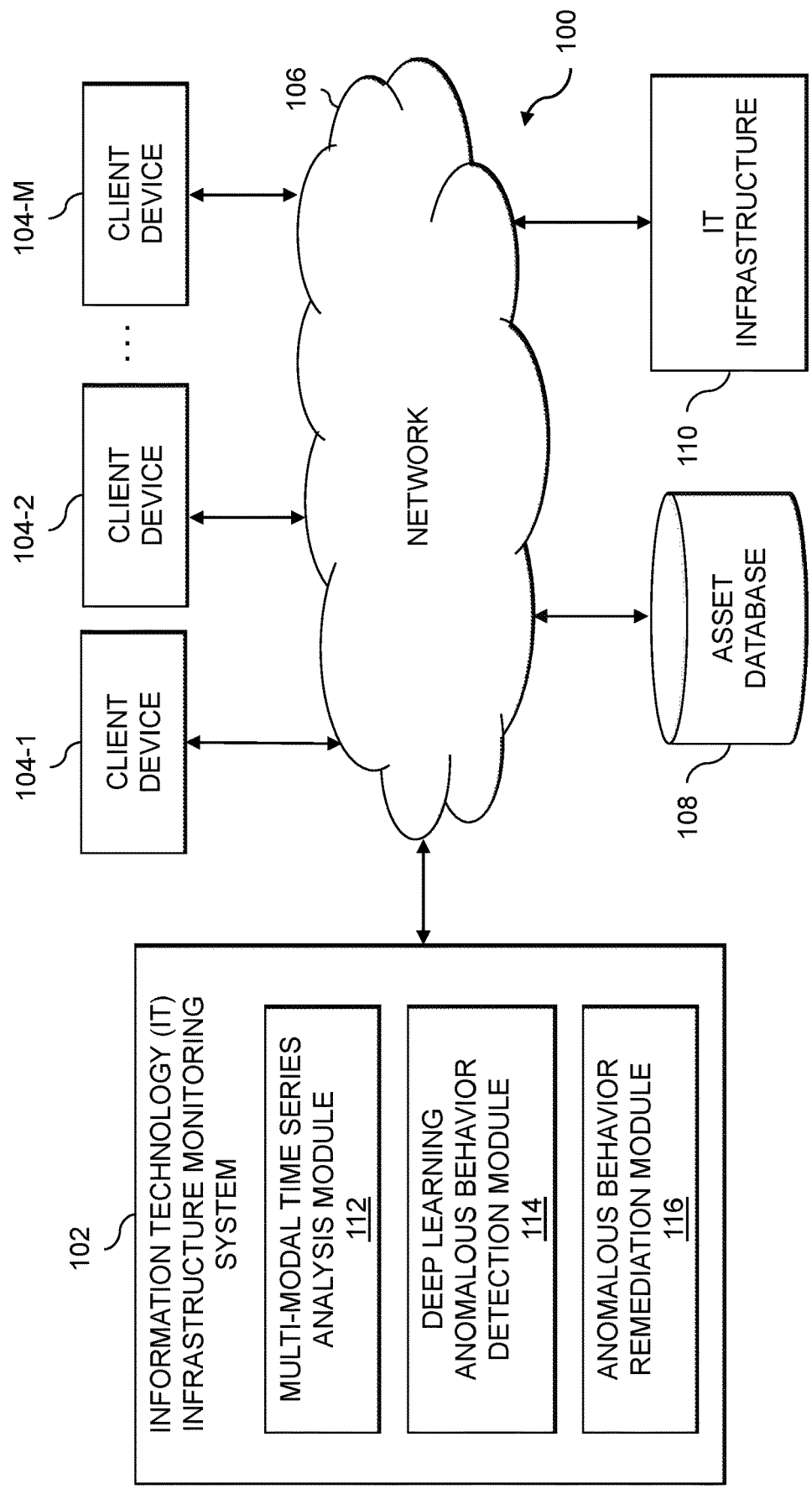
FIG. 1 is a block diagram of an information processing system with an information technology infrastructure monitoring system configured for detecting behavior patterns associated with assets in an information technology infrastructure in an illustrative embodiment of the invention.

FIG. 1 shows an information processing system 100 configured in accordance with an illustrative embodiment. The information processing system 100 is assumed to be built on at least one processing platform and provides functionality for detecting behavior patterns (e.g., anomalous behavior) utilizing multi-modal time series analysis of diagnostic data. The information processing system 100 includes an information technology (IT) infrastructure monitoring system 102 and a plurality of client devices 104-1, 104-2, . . . 104-M (collectively client devices 104). The IT infrastructure monitoring system 102 and client devices 104 are coupled to a network 106. Also coupled to the network 106 is an asset database 108, which may store various information relating to diagnostic and other metrics associated with a plurality of assets of IT infrastructure 110 also coupled to the network 106. The assets may include, by way of example, physical and virtual computing resources in the IT infrastructure 110. Physical computing resources may include physical hardware such as servers, storage systems, networking equipment, Internet of Things (IoT) devices, other types of processing and computing devices, etc. Virtual computing resources may include virtual machines (VMs), software containers, etc.

The assets of the IT infrastructure 110 (e.g., physical and virtual computing resources thereof) may generate various telemetry data, such as various diagnostic metrics associated with the assets themselves or an environment in which the assets operate. Such diagnostic metrics or telemetry data may be stored in the asset database 108. In some embodiments, it is assumed that the telemetry data is in the form of time series data sets or data streams (e.g., produced by IoT devices in the IT infrastructure 110).

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, software containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The asset database 108, as discussed above, is configured to store and record information relating to diagnostic and instrumentation data, or more generally telemetry data, that is collected from assets in the IT infrastructure 110. The asset database 108 may also store various models generated from such telemetry data, such as a binary classifier model, a delta model, etc. as will be described in further detail below. Various other information may be stored in the asset database 108 in other embodiments as discussed in further detail below.

The asset database 108 in some embodiments is implemented using one or more storage systems or devices associated with the IT infrastructure monitoring system 102. In some embodiments, one or more of the storage systems utilized to implement the asset database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the IT infrastructure monitoring system 102, as well as to support communication between the IT infrastructure monitoring system 102 and other related systems and devices not explicitly shown.

The client devices 104 are configured to access or otherwise utilize assets of the IT infrastructure 110 (e.g., applications that are running on or hosted by such assets). In some embodiments, the assets (e.g., physical and virtual computing resources) of the IT infrastructure 110 are operated by or otherwise associated with one or more companies, businesses, organizations, enterprises, or other entities. For example, in some embodiments the assets of the IT infrastructure 110 may be operated by a single entity, such as in the case of a private data center of a particular company. In other embodiments, the assets of the IT infrastructure 110 may be associated with multiple different entities, such as in the case where the assets of the IT infrastructure 110 provide a cloud computing platform or other data center where resources are shared amongst multiple different entities.

The term "user" herein is intended to be broadly construed so as to encompass numerous arrangements of human, hardware, software or firmware entities, as well as combinations of such entities.

In the present embodiment, alerts or notifications generated by the IT infrastructure monitoring system 102 are provided over network 106 to client devices 104, or to a system administrator, IT manager, or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the IT infrastructure monitoring system 102. For example, a given host agent may comprise a mobile telephone equipped with a mobile application configured to receive alerts or notifications from the IT infrastructure monitoring system 102 (e.g., when anomalous behavior is detected, when remedial actions are recommended or applied, etc.). The given host agent provides an interface for responding to such various alerts or notifications as described elsewhere herein.

It should be noted that a "host agent" as this term is generally used herein may comprise an automated entity, such as a software entity running on a processing device. Accordingly, a host agent need not be a human entity.

The IT infrastructure monitoring system 102 in the FIG. 1 embodiment is assumed to be implemented using at least one processing device. Each such processing device generally comprises at least one processor and an associated memory, and implements one or more functional modules for controlling certain features of the IT infrastructure monitoring system 102. In the FIG. 1 embodiment, the IT infrastructure monitoring system 102 comprises a multi-modal time series analysis module 112, a deep learning anomalous behavior detection module 114, and an anomalous behavior remediation module 116.

The IT infrastructure monitoring system 102 is configured to obtain time series diagnostic data associated with a plurality of assets in the IT infrastructure 110 (e.g., from IoT devices monitoring the IT infrastructure 110). The time series diagnostic data may comprise feature values for a plurality of features measured for a plurality of time periods. The multi-modal time series analysis module 112 is configured to generate first and at least second modality information for the time series diagnostic data. The first modality information comprises behavior labels assigned to each of the plurality of time periods. The behavior labels, in some embodiments, are assigned using a binary classifier that analyzes, for a given time period, the measured feature values for the plurality of features collectively to determine whether such values correspond to a first type of behavior (e.g., normal behavior) or a second type of behavior (e.g., abnormal behavior). The second modality information comprises feature deltas characterizing differences between measured feature values for interdependent pairs of the plurality of features in each of the plurality of time periods.

The multi-modal time series analysis module 112 utilizes the first and second modality information to train a machine learning model (e.g., a deep learning model, such as a long short term memory (LSTM) type recurrent neural network (RNN) implemented using the deep learning anomalous behavior detection module 114. The deep learning anomalous behavior detection module 114 utilizes the trained machine learning model to detect behavior patterns in the time series diagnostic data.

The anomalous behavior remediation module 116 is configured to initiate remedial action in the IT infrastructure 110 responsive to detecting anomalous behavior patterns in the time series diagnostic data. This advantageously enables proactive remediation of anomalous behavior, in that streams of diagnostic data (e.g., from IoT devices in the IT infrastructure 110) may be continually or periodically analyzed using the trained machine learning model to predict when anomalous behavior patterns are or will occur. The anomalous behavior patterns may correspond to device or environment state indicative of security threats, potential failure of assets, etc. The anomalous behavior remediation module 116 may be configured to identify assets in the IT infrastructure 110 that are or will be affected by the detected anomalous behavior patterns and apply remedial actions to such affected assets (e.g., applying security hardening procedures, modifying asset configuration, etc.).

It is to be appreciated that the particular arrangement of the IT infrastructure monitoring system 102, client devices 104, asset database 108 and IT infrastructure 110 illustrated in the FIG. 1 embodiment is presented by way of example only, and alternative arrangements can be used in other embodiments. For example, the IT infrastructure monitoring system 102, or one or more portions thereof such as the multi-modal time series analysis module 112, the deep learning anomalous behavior detection module 114, and the anomalous behavior remediation module 116, may in some embodiments be implemented internal to one or more of the client devices 104 or the IT infrastructure 110. As another example, the functionality associated with the multi-modal time series analysis module 112, the deep learning anomalous behavior detection module 114, and the anomalous behavior remediation module 116 may be combined into one module, or separated across more than three modules with the multiple modules possibly being implemented with multiple distinct processors or processing devices.

At least portions of the multi-modal time series analysis module 112, the deep learning anomalous behavior detection module 114, and the anomalous behavior remediation module 116 may be implemented at least in part in the form of software that is stored in memory and executed by a processor.

It is to be understood that the particular set of elements shown in FIG. 1 for detecting behavior patterns utilizing a machine learning model trained based at least in part on multi-modal time series analysis of diagnostic data is presented by way of illustrative example only, and in other embodiments additional or alternative elements may be used. Thus, another embodiment may include additional or alternative systems, devices and other network entities, as well as different arrangements of modules and other components.

The IT infrastructure monitoring system 102 may be part of or otherwise associated with another system, such as a governance, risk and compliance (GRC) system, a security operations center (SOC), a critical incident response center (CIRC), a security analytics system, a security information and event management (STEM) system, etc.

The IT infrastructure monitoring system 102, and other portions of the system 100, in some embodiments, may be part of cloud infrastructure as will be described in further detail below. The cloud infrastructure hosting the IT infrastructure monitoring system 102 may also host any combination of the IT infrastructure monitoring system 102, one or more of the client devices 104, the asset database 108 and the IT infrastructure 110.

The IT infrastructure monitoring system 102 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and the IT infrastructure monitoring system 102 or components thereof (e.g., the multi-modal time series analysis module 112, the deep learning anomalous behavior detection module 114, and the anomalous behavior remediation module 116) may be implemented on respective distinct processing platforms, although numerous other arrangements are possible. For example, in some embodiments at least portions of the IT infrastructure monitoring system 102 and one or more of the client devices 104 are implemented on the same processing platform. A given client device (e.g., 104-1) can therefore be implemented at least in part within at least one processing platform that implements at least a portion of the IT infrastructure monitoring system 102. Similarly, at least a portion of the IT infrastructure monitoring system 102 may be implemented at least in part within at least one processing platform that implements at least a portion of the IT infrastructure 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the IT infrastructure monitoring system 102, the client devices 104, the asset database 108 and the IT infrastructure 110, or portions or components thereof, to reside in different data centers. Numerous other distributed implementations are possible. The IT infrastructure monitoring system 102 can also be implemented in a distributed manner across multiple data centers.

Additional examples of processing platforms utilized to implement the IT infrastructure monitoring system 102 in illustrative embodiments will be described in more detail below in conjunction with FIGS. 10 and 11.

It is to be appreciated that these and other features of illustrative embodiments are presented by way of example only, and should not be construed as limiting in any way.

An exemplary process for detecting behavior patterns utilizing a machine learning model trained based at least in part on multi-modal time series analysis of diagnostic data will now be described in more detail with reference to the flow diagram of FIG. 2. It is to be understood that this particular process is only an example, and that additional or alternative processes for detecting behavior patterns utilizing a machine learning model trained based at least in part on multi-modal time series analysis of diagnostic data can be carried out in other embodiments.

In this embodiment, the process includes steps 200 through 208. These steps are assumed to be performed by the IT infrastructure monitoring system 102 utilizing the multi-modal time series analysis module 112, the deep learning anomalous behavior detection module 114, and the anomalous behavior remediation module 116. The process begins with step 200, obtaining time series diagnostic data associated with a plurality of assets in an IT infrastructure (e.g., IT infrastructure 110). The time series diagnostic data comprises feature values for a plurality of features measured for a plurality of time periods. In some embodiments, the time series diagnostic data is obtained from one or more IoT devices and comprises information characterizing device health of the IoT devices or of other assets of the IT infrastructure.

Step 200, in some embodiments, includes separating the time series diagnostic data into two or more chunks, where the two or more chunks of the time series diagnostic data comprise feature data for the plurality of features collected from the plurality of assets in the information technology infrastructure. The feature data collected from different ones of the plurality of assets in the information technology infrastructure may have different sample lengths per a designated time unit (e.g., one hour, one day, etc.). Step 200 may further include transforming the feature data in the two or more chunks of the time series diagnostic data to have an equal sample length per the designated time unit. Each of the plurality of time periods may have a duration equal to the designated time unit. Transforming the feature data in the two or more chunks of the time series diagnostic data to have the equal sample length per the designated time unit may comprise computing a mean time sample length of the feature data across the two or more chunks of the time series diagnostic data, truncating sample lengths for feature data in the two or more chunks of the time series diagnostic data that are longer than the mean time sample length, and padding dummy data for feature data in the two or more chunks of the time series diagnostic data that are shorter than the mean time sample length.

Figure 2:
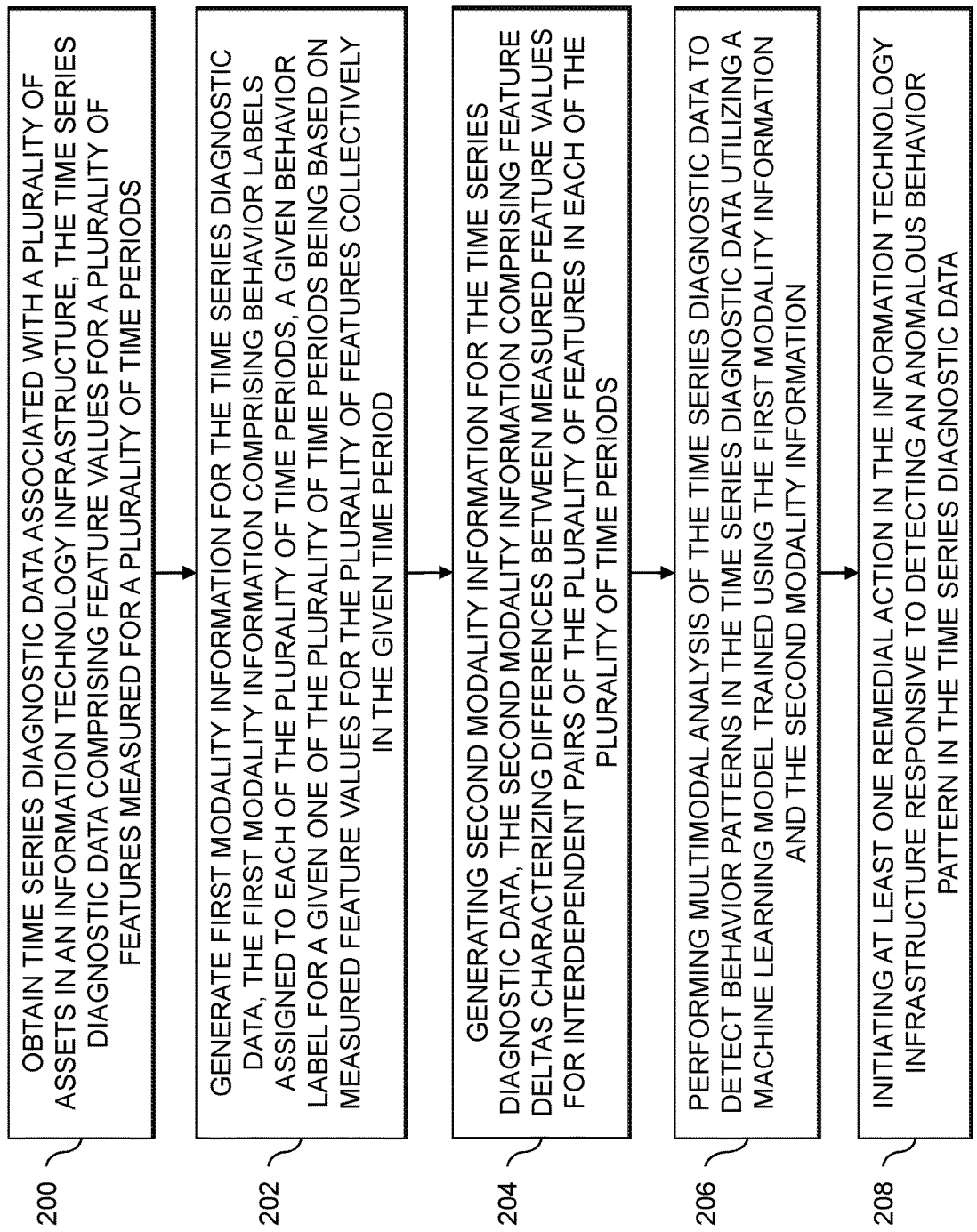
FIG. 2 is a flow diagram of an exemplary process for detecting behavior patterns utilizing a machine learning model trained based at least in part on multi-modal time series analysis of diagnostic data in an illustrative embodiment.

The FIG. 2 process continues with step 202, generating first modality information for the time series diagnostic data. The first modality information comprises behavior labels assigned to each of the plurality of time periods. A given behavior label for a given one of the plurality of time periods is based at least in part on measured feature values for the plurality of features collectively in the given time period. In some embodiments, the behavior labels are assigned on a per-asset or per-device basis (e.g., such that individual IoT devices or assets, or groups thereof, may be labeled as experiencing normal or abnormal behavior in each time period). Step 202, in some embodiments, includes assigning the asset behavior labels for each of the plurality of time periods utilizing a binary classifier model. The binary classifier model is configured to label asset behavior during each of the plurality of time periods as one of normal behavior and abnormal behavior.

In step 204, second modality information is generated for the time series diagnostic data. The second modality information comprises feature deltas characterizing differences between measured feature values for interdependent pairs of the plurality of features in each of the plurality of time periods. Step 204 may include analyzing the time series diagnostic data to generate a feature dependency matrix (FDM) characterizing interdependencies between pairs of the plurality of features, and identifying the interdependent pairs of the plurality of features based at least in part on the FDM. A given interdependent pair of the plurality of features may comprises a first one of the plurality of features and a second one of the plurality of features, and the feature deltas for the given interdependent pair of the plurality of features may characterize relative differences between the first feature and the second feature across the plurality of time periods. The feature deltas for the given interdependent pair of the plurality of features may be non-absolute and independent of positioning in the time series diagnostic data.

Multi-modal analysis of the time series diagnostic data is performed in step 206 to detect behavior patterns in the time series diagnostic data utilizing a machine learning model trained using the first modality information and the second modality information. In step 208, at least one remedial action is initiated in the IT infrastructure responsive to detecting an anomalous behavior pattern in the time series diagnostic data in step 206. Step 208 may include one or more of: applying one or more security hardening procedures to one or more of the plurality of assets associated with the detected anomalous behavior; modifying a configuration of one or more of the plurality of assets associated with the detected anomalous behavior; and modifying access, by one or more of a plurality of users, to one or more of the plurality of assets associated with the detected anomalous behavior.

The machine learning model may comprise an LSTM model or other type of RNN or other deep learning model that is configured to detect behavior patterns in the time series diagnostic data based at least in part on (i) first patterns in the generated first modality information corresponding to feature values of the plurality of features across the plurality of time periods and (ii) second patterns in the generated second modality information corresponding to differences between the interdependent pairs of features across the plurality of time periods. Utilizing the trained machine learning model to detect behavior patterns in the time series diagnostic data may comprise identifying at least a subset of the plurality of assets in the IT infrastructure affected by the detected anomalous behavior pattern in the time series diagnostic data. Step 208 may include applying the at least one remedial action to the identified subset of the plurality of assets in the information technology infrastructure affected by the detected anomalous behavior pattern in the time series diagnostic data.

IoT and edge devices may provide a robust set of diagnostics and instrumentation data metrics for monitoring device state and health (e.g., of the IoT or edge devices themselves, or other assets in an environment that the IoT or edge devices are configured to monitor). The diagnostics and instrumentation data metrics may include, for example, device hardware, firmware or application code metrics. The diagnostics and instrumentation data metrics may also or alternatively represent some external environment metrics for the environment in which a particular IoT or edge device is operating and relates to it. Diagnostics and instrumentation data metrics are also referred to herein as telemetry data. Telemetry data on operational and device performance may come in the form of time series data streams with proper time stamps. With increased growth in IoT devices (e.g., exponential growth that is projected to be in the billions in the near future), however, it is increasingly challenging to remotely monitor such devices in the field. Such remote monitoring is desired for accurately predicting anomalous behavior to enable proactive rather than reactive remediation.

Illustrative embodiments provide techniques for detecting anomalous behavior in IoT data streams (e.g., or other data streams obtained from edge devices or other types of assets that are in or are configured to monitor IT infrastructure) by performing a multi-modal data analysis. The multi-modal data analysis uses an ensemble of a binary classification model and a feature delta model. Deep learning techniques are then applied on the combined ensemble model to predict abnormal device behavior. Such predictions may be used to perform proactive remediation in associated devices or other assets in an IT infrastructure.

In some embodiments, FDMs are used to represent interdependent relationships between features. In the description below, it is assumed that the devices being analyzed are IoT devices. As discussed above, however, the techniques described herein may also be used for data collected from or otherwise associated with edge devices or, more generally, data that is collected from or otherwise associated with physical and virtual computing resources (e.g., assets in IT infrastructure 110). IoT device data is analyzed, identified and tested to determine which feature dependencies best represent the device behavior in a model. Once identified, such feature dependencies are updated in an FDM.

Figure 3:
FIG. 3 shows a feature dependency matrix indicating interdependent relationships between features of telemetry data collected from Internet of Things (IoT) devices in an illustrative embodiment.

FIG. 3 shows an example FDM 300. The FDM 300 shows interdependency relationships for six features denoted F1 through F6. While FIG. 3 shows an example where there are only six features, embodiments are not limited to use with six features. More or less than six features may be used in other embodiments. In FDM 300, a value of 1 denotes that a dependent relationship exists between a pair of features, and a value of 0 denotes that a dependent relationship does not exist between a pair of features. FDMs may be built using automated or manual feature selection approaches, using techniques similar to those used for feature engineering or dimensionality reduction processes in machine learning. FDMs may be used for building feature delta data models as described in further detail below.

The FDMs used in some embodiments capture data patterns between correlated features, and may be symmetrical or asymmetrical. In a symmetrical FDM, all features are either bidirectionally related or not related at all. In an asymmetrical FDM, features may be directionally related, bidirectionally related, or not related at all. Consider, as an example, sensor data obtained from a vehicle and features of speed and engine temperature. If these features are directionally related or correlated, for example, an increase in speed may affect (e.g., increase) engine temperature, but the opposite relationship is not true (e.g., an increase in engine temperature is not necessarily correlated with increase in speed). As another example, features of speed and distance covered may be bidirectionally correlated, in that if speed increases the distance covered will also increase in most scenarios, and vice versa. Feature delta models described in further detail below may capture feature deltas for both directional and bidirectional relationships separately.

Figure 4:
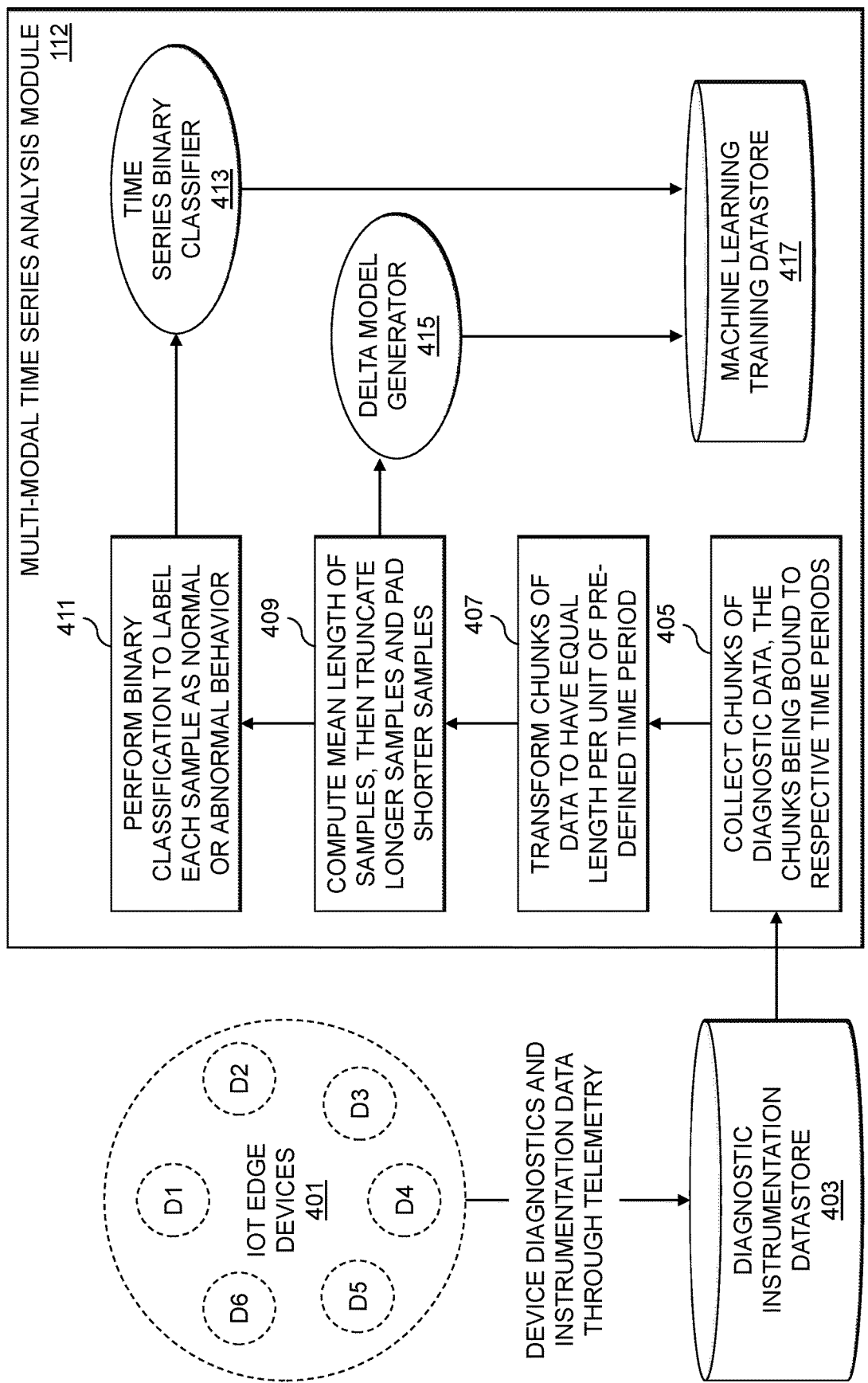
FIG. 4 shows a system flow for performing time series analysis of IoT data streams in an illustrative embodiment.

FIG. 4 shows a system flow for performing time series analysis of IoT data streams. As shown, a set of IoT edge devices 401 (e.g., devices D1 through D6) provide device diagnostics and instrumentation data through telemetry for storage in a diagnostic instrumentation datastore 403 (e.g., which may be part of the asset database 108). The multimodal time series analysis module 112 utilizes the telemetry data stored in diagnostic instrumentation datastore 403. In block 405, chunks of IoT diagnostic data are collected from the diagnostic instrumentation datastore 403. The chunks of the IoT diagnostic data are assumed to be time period bound (e.g., to some pre-defined time period such as minutes, hours, days, etc.).

Each chunk of the IoT diagnostic data may include a set of features per unit of time interval (e.g., minute, hour, day, etc.). Assume, for example, that the chunk time interval is one hour. Each of the IoT edge devices 401 may have different speeds at which they send feature data, including situations in which the same IoT edge device provides feature data for a first feature at a different speed or rate than it provides feature data for a second feature. Consider, as an example, a situation in which IoT edge device D1 sends 100 data points per hour for a given feature, while IoT edge device D2 sends 75 data points per hour for the given feature, depending on speed and latency. To synchronize this and maintain consistency, the chunks of data may be transformed to have equal length per some designated pre-defined time period unit (e.g., a minute, an hour, a day) in block 407.

The block 407 transformation, in some embodiments, includes optional block 409 where a mean length of the samples is computed, followed by truncating longer-length samples and padding shorter-length samples with dummy data (e.g., 0s) or otherwise imputing missing values. Block 409 is an example of imputation used to fill in gaps or to substitute some data to maintain uniformity from a modeling perspective.

In block 411, binary classification is performed to label each sample as normal or abnormal behavior based at least in part on historical data. In some embodiments, "1" is used as a label for normal behavior and "−1" is used as a label for abnormal behavior. The results of block 411 are used as training data for a time series binary classifier 413 as will be described in further detail below with respect to FIG. 5. The time series binary classifier 413 is configured to classify data elements into two classes or categories based on a set of features. Various classification algorithms may be used in implementing the time series binary classifier 413, including classification algorithms that utilize logistic regression, decision tree, random forest, support-vector machine (SVM), k-nearest neighbor (KNN), etc. The results of block 409 are used as training data for a delta model generator 415, as will be described in further detail below with respect to FIGS. 6A-6C and 7. The time series binary classifier 413 and delta model generator 415 may store associated training data in a machine learning training datastore 417 (e.g., which may be part of the asset database 108).

FIG. 5 shows a table 500 with sample data for features 1 through 6 at different dates and times. The set of features for a particular date and time is assigned a class label (e.g., 1 for normal behavior, −1 for abnormal behavior). The features 1 through 6 (also referred to as features F1 through F6) may represent various features or other metrics that are measured and obtained from IoT devices. Different IoT device platforms and manufacturers may provide different metrics characterizing device health status. The actual features used in a particular implementation may be based at least in part on the available metrics for the IoT devices being monitored. In addition, while FIG. 5 shows an example where there are only six features, embodiments are not limited to use with six features. More or less than six features may be used in other embodiments.

In some embodiments, the features or metrics may include one or more of: a number of device-to-cloud telemetry messages attempted to be sent to an IoT hub; a number of device-to-cloud telemetry messages sent successfully to the IoT hub; a number of cloud-to-device messages abandoned by the device; a number of expired cloud-to-device messages; a number of times messages were successfully delivered to all endpoints using IoT hub routing (where, if a message is routed to multiple endpoints, this value increases by one for each successful delivery, and where, if a message is delivered to the same endpoint multiple times, this value increases by one for each successful delivery); a number of times messages were dropped by the IoT hub routing due to dead endpoints (where this value does not count messages delivered to fallback routes as dropped messages are not delivered there); a number of times messages were orphaned by the IoT hub routing because they didn't match any routing rules (including the fallback rule); a number of times the IoT hub routing failed to deliver messages due to an incompatibility with the endpoint (where this value does not include retries); a number of times the IoT hub routing delivered messages to the endpoint associated with the fallback route; an average latency (in milliseconds) between message ingress to the IoT hub and message ingress into an event hub endpoint; an amount of data (in bytes) that IoT hub routing delivered to storage endpoints; etc. It should be appreciated that the above metrics are presented by way of example only, and that various other metrics may be used in addition to or in place of one or more of the above-described metrics.

FIGS. 6A-6C show tables 600, 605 and 610, respectively, illustrate calculation of feature deltas for pairs of the features F1-F6 that have interdependency relationships (e.g., as determined using an FDM such as FDM 300). The feature delta model is built on delta variations of the IoT device metrics or features over a finite time series, and tracks anomalous patterns in the delta series rather than the data series itself. It should be noted that this is different than tracking patterns in the feature data itself, and the delta variation patterns are non-absolute and independent of positioning on the time series. This difference is highlighted in plots 700 and 705 shown in FIG. 7. Plot 700 shows data patterns in the feature data itself, while plot 705 shows the data patterns in the feature deltas. The feature data in the FIG. 7 examples includes two features, Feature 1 and Feature 2. The Feature 1 values are: 23, 34, 45, 34, 67, 43, 67, 45, 23, 87, 56, 87, 98, 65, 45, 98, 56, 43, 67, 45, 33, 76, 45. The Feature 2 values are: 43, 34, 33, 65, 34, 23, 67, 44, 76, 77, 87, 56, 67, 56, 65, 78, 67, 89, 67, 87, 45, 34, 45. The feature delta, ΔA=|Feature 1−Feature 2|=20, 0, 12, 31, 33, 20, 0, 1, 53, 10, 31, 31, 31, 9, 20, 20, 11, 46, 0, 42, 12, 42, 0. As illustrated, the patterns in the feature deltas are relative, non-absolute, and independent of positioning on the time series. This increases the chances of a deep learning model (e.g., an LSTM model as described in further detail below) to pick up anomalous behavior patterns more accurately.

Figure 8:
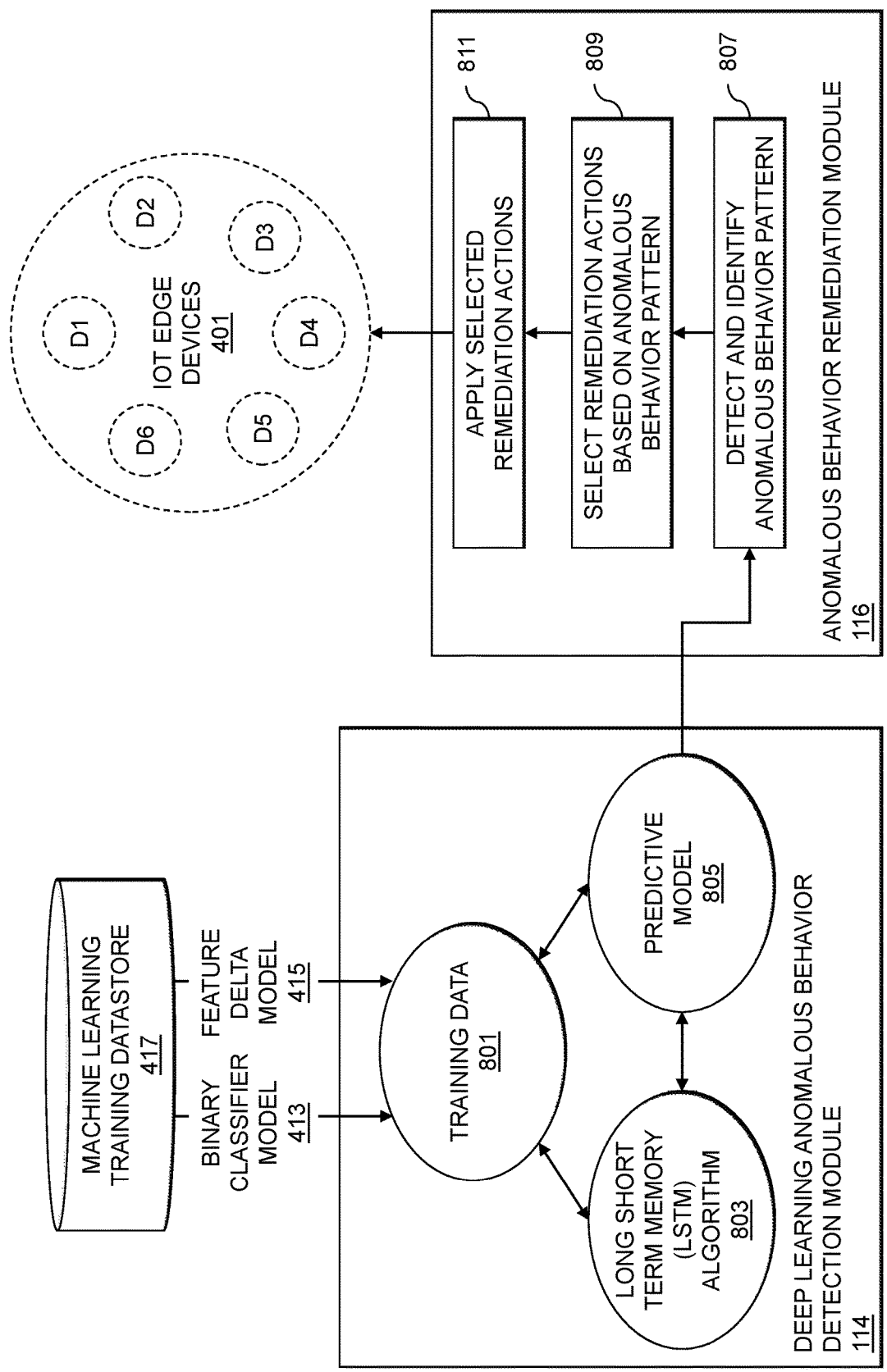
FIG. 8 shows a system flow for identifying anomalous behavior patterns in IoT data streams using deep learning in an illustrative embodiment.

FIG. 8 shows a system flow for identifying anomalous behavior patterns in IoT data streams (e.g., from IoT edge devices 401) using deep learning. The deep learning behavior detection module 114 is configured to utilize, as training data 801, the binary classifier model 413 and feature delta model 415 stored in the machine learning datastore 417. The training data 801 is used for training a deep learning model which, in the FIG. 8 example, is an LSTM algorithm or model 803. The LSTM algorithm 803 is used by a predictive model 805 to characterize telemetry data (e.g., diagnostic instrumentation data for IoT edge devices 401 stored in the diagnostic instrumentation datastore 403) as normal or anomalous. The output of the predictive model 805, in some embodiments, is utilized as additional training data 801 such that, as more and more IoT data streams are analyzed, more and more data becomes available for model training and accuracy increases over time.

LSTM models are an enhanced version of RNNs, and fill in gaps where RNNs may fail (e.g., some non-LSTM RNNs are unable to work with longer sequences to remember long-term learning and dependencies, making them suffer from short-term memory and resultant inaccuracies). The design of LSTM enables LSTM models to hold on to long term memories. LSTM models may use a gating mechanism within each cell. Unlike non-LSTM RNNs, at each step the LSTM cell takes in three different pieces of information: (i) the current input data; (ii) the short-term memory from the previous cell (e.g., hidden states); and (iii) the long-term memory (e.g., cell state). Gates are used to regulate which information is to be kept and which is to be discarded at each step before passing on the long-term and short-term information to the next LSTM cell. These gates are trained to accurately filter the useful information which could be used for future prediction. There are three types of gates used in LSTM cells, referred to as the input gate, the forget gate, and the output gate. The input gate decides what new information will be stored in the long-term memory and it only works with the information from the current input and the short-term memory from the previous time step. The input gate discards or filters information deemed not useful. The forget gate decides which information from the long-term memory should be discarded. The forget gate uses the incoming long term memory and multiplies it by a forget vector generated from the current input and incoming short-term memory. The output gate takes the current input, previous short-term memory and newly computed long-term memory to produce the new short-term memory, which will be passed on to the LSTM cell in the next time step. The short-term and long-term memory produced by these gates will then be carried over to the next LSTM cell for the process to be repeated.

The anomalous behavior remediation module 116, in block 807, detects and identifies anomalous behavior patterns in the IoT data streams of the IoT edge devices 401 using the predictive model 805 and LSTM algorithm 803. In block 809, the anomalous behavior remediation module 116 selects one or more remedial actions based at least in part on the anomalous behavior patterns identified in block 809. In block 811, the anomalous behavior remediation module 116 applies the selected remedial actions to the IoT edge devices 401.

Various types of remedial actions may be selected and applied to the IoT edge devices 401 based at least in part on the type of detected anomalous behavior. For example, if the detected anomalous behavior in block 807 is indicative of security threats (e.g., viruses, malware, etc.), the remedial action selected in block 809 may include applying one or more security hardening procedures to affected ones of the IoT edge devices 401. Alternatively, the remedial action selected in block 809 may include modifying access by users (e.g., of client devices 104) to particular ones of the IoT edge devices 401, modifying configurations of the IoT edge devices 401, etc. Remedial actions may also be applied to one or more devices and systems that are associated with the IoT edge devices 401, rather than the IoT edge devices 401 themselves. As discussed above, the IoT edge devices 401 in some embodiments may be used to monitor an associated environment (e.g., such as environmental conditions in a data center, warehouse, etc.). When the telemetry data collected from the IoT edge devices 401 is indicative of abnormal behavior in the associated environment, the remedial actions may be applied to devices and systems in the environment other than the IoT edge devices 401 (e.g., including assets such as physical and virtual computing resources in IT infrastructure 110, where such assets may be different than the IoT edge devices 401 that the IoT data streams are collected from).

FIGS. 9A-9C show respective portions 900, 905 and 910 of pseudocode for implementing a deep learning model for identifying anomalous behavior in IoT data streams. While the pseudocode 900, 905 and 910 in FIGS. 9A-9C utilizes the Python programming language, it should be appreciated that various other programming languages may be utilized. Pseudocode 900 illustrates code for performing steps of collecting the IoT stream data and preparing the training data set. Pseudocode 905 illustrates code for building the training data set as well as validation and test data sets. Pseudocode 910 illustrates code for deep learning model training and execution.

Advantageously, the techniques described herein provide various improvements for time series analysis (e.g., of IoT data streams) by building a multi-modal ensemble data model for training a deep learning system to predict anomalous IoT or other device behavior. The multi-modal ensemble data model relies, in part, on delta patterns in feature data rather than feature data pattern itself. Thus, the multi-modal ensemble data model is at least in part non-absolute, relative and independent of the time-space positioning.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for detecting behavior patterns utilizing a machine learning model trained based at least in part on multi-modal time series analysis of diagnostic data will now be described in greater detail with reference to FIGS. 10 and 11. Although described in the context of system 100, these platforms may also be used to implement at least portions of other information processing systems in other embodiments.

Figure 10:
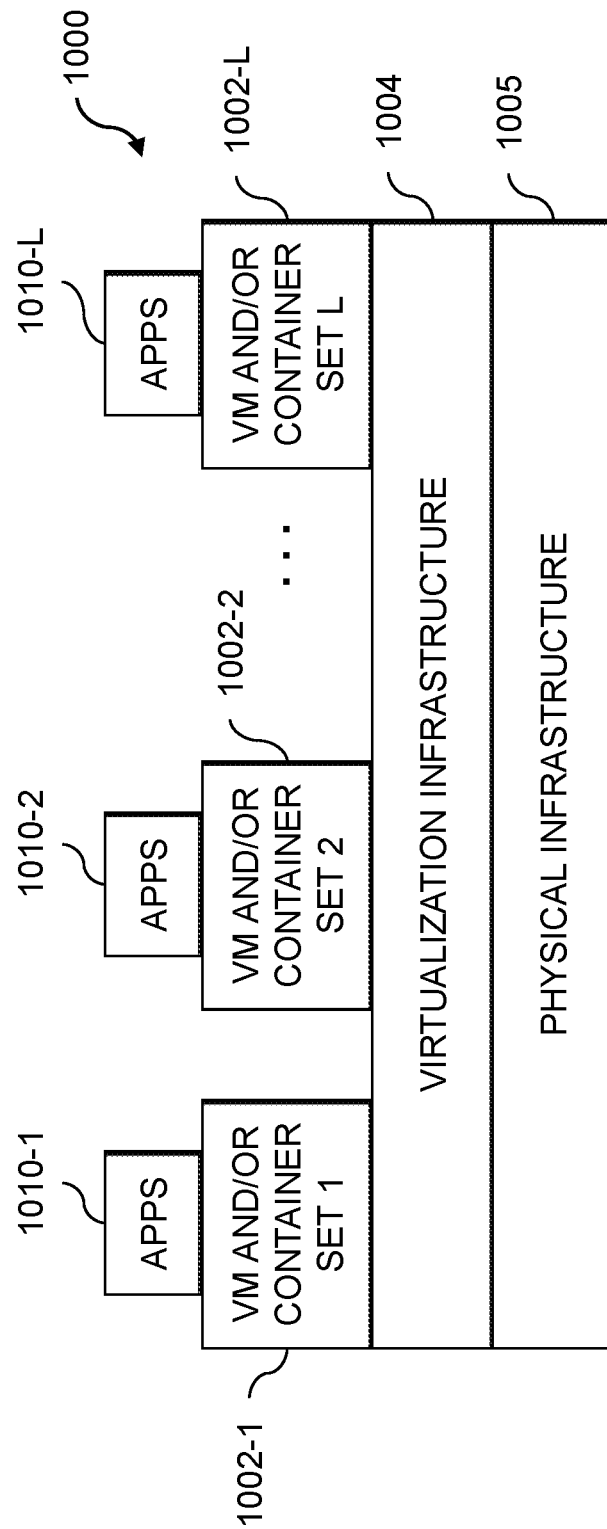
FIGS. 10 and 11 show examples of processing platforms that may be utilized to implement at least a portion of an information processing system in illustrative embodiments.
Figure 11:
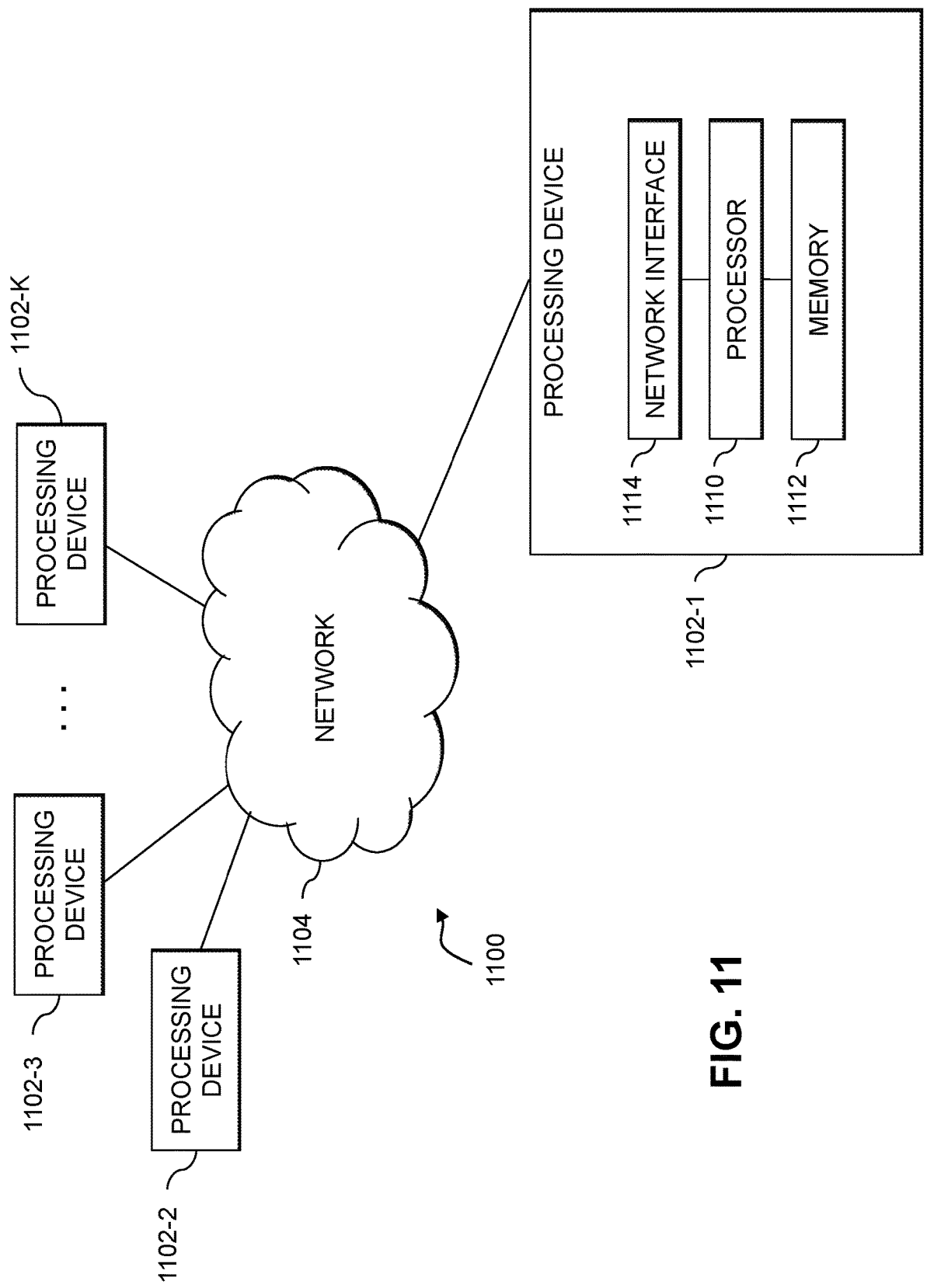

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for detecting behavior patterns utilizing a machine learning model trained based at least in part on multi-modal time series analysis of diagnostic data as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, devices, diagnostic metrics, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        obtaining time series diagnostic data associated with a plurality of assets in an information technology infrastructure, the time series diagnostic data comprising feature values for a plurality of features measured for a plurality of time periods;
        generating first modality information for the time series diagnostic data, the first modality information comprising behavior labels assigned to each of the plurality of time periods, a given behavior label for a given one of the plurality of time periods being based at least in part on measured feature values for the plurality of features collectively in the given time period;
        generating second modality information for the time series diagnostic data, the second modality information comprising feature deltas characterizing differences between measured feature values for interdependent pairs of the plurality of features in each of the plurality of time periods;
        performing multi-modal analysis of the time series diagnostic data to detect behavior patterns in the time series diagnostic data utilizing a machine learning model trained using the first modality information and the second modality information; and
        initiating at least one remedial action in the information technology infrastructure responsive to detecting an anomalous behavior pattern in the time series diagnostic data.

2. The apparatus of claim 1 wherein the time series diagnostic data is obtained from a plurality of Internet of Things (IoT) devices associated with the information technology infrastructure, and wherein the time series diagnostic data characterizes device health of one or more of the plurality of assets of the information technology infrastructure.

3. The apparatus of claim 1 wherein obtaining the time series diagnostic data associated with the plurality of assets comprises:
    separating the time series diagnostic data into two or more chunks, wherein the two or more chunks of the time series diagnostic data comprise feature data for the plurality of features collected from the plurality of assets in the information technology infrastructure, the feature data collected from different ones of the plurality of assets in the information technology infrastructure having different sample lengths per a designated time unit; and transforming the feature data in the two or more chunks of the time series diagnostic data to have an equal sample length per the designated time unit.

4. The apparatus of claim 3 wherein the designated time unit comprises a duration of each of the plurality of time periods.

5. The apparatus of claim 3 wherein transforming the feature data in the two or more chunks of the time series diagnostic data to have the equal sample length per the designated time unit comprises:

computing a mean time sample length of the feature data across the two or more chunks of the time series diagnostic data;

truncating sample lengths for feature data in the two or more chunks of the time series diagnostic data that are longer than the mean time sample length; and padding dummy data for feature data in the two or more chunks of the time series diagnostic data that are shorter than the mean time sample length.

6. The apparatus of claim 1 wherein generating the first modality information for the time series diagnostic data comprises assigning the asset behavior labels for each of the plurality of time periods utilizing a binary classifier model.

7. The apparatus of claim 6 wherein the binary classifier model is configured to label asset behavior during each of the plurality of time periods as one of normal behavior and abnormal behavior.

8. The apparatus of claim 1 wherein generating the second modality information for the time series diagnostic data comprises:

analyzing the time series diagnostic data to generate a feature dependency matrix characterizing interdependencies between pairs of the plurality of features; and identifying the interdependent pairs of the plurality of features based at least in part on the feature dependency matrix.

9. The apparatus of claim 1 wherein a given interdependent pair of the plurality of features comprises a first one of the plurality of features and a second one of the plurality of features, and wherein feature deltas for the given interdependent pair of the plurality of features characterize relative differences between the first feature and the second feature across the plurality of time periods.

10. The apparatus of claim 9 wherein the feature deltas for the given interdependent pair of the plurality of features are non-absolute and independent of positioning in the time series diagnostic data.

11. The apparatus of claim 1 wherein the machine learning model comprises a long short term memory (LSTM) model configured to detect behavior patterns in the time series diagnostic data based at least in part on (i) first patterns in the generated first modality information corresponding to feature values of the plurality of features across the plurality of time periods and (ii) second patterns in the generated second modality information corresponding to differences between the interdependent pairs of features across the plurality of time periods.

12. The apparatus of claim 11 wherein utilizing the trained machine learning model to detect behavior patterns in the time series diagnostic data comprises identifying at least a subset of the plurality of assets in the information technology infrastructure affected by the detected anomalous behavior pattern in the time series diagnostic data.

13. The apparatus of claim 12 wherein initiating the at least one remedial action in the information technology infrastructure responsive to detecting the anomalous behavior pattern in the time series diagnostic data comprises applying the at least one remedial action to the identified subset of the plurality of assets in the information technology infrastructure affected by the detected anomalous behavior pattern in the time series diagnostic data.

14. The apparatus of claim 1 wherein initiating the at least one remedial action comprises at least one of:

applying one or more security hardening procedures to one or more of the plurality of assets associated with the detected anomalous behavior;

modifying a configuration of one or more of the plurality of assets associated with the detected anomalous behavior; and modifying access, by one or more of a plurality of users, to one or more of the plurality of assets associated with the detected anomalous behavior.

15. A computer program product comprising a non-transitory processor-readable storage medium having stored therein program code of one or more software programs, wherein the program code when executed by at least one processing device causes the at least one processing device to perform steps of:

obtaining time series diagnostic data associated with a plurality of assets in an information technology infrastructure, the time series diagnostic data comprising feature values for a plurality of features measured for a plurality of time periods;

generating first modality information for the time series diagnostic data, the first modality information comprising behavior labels assigned to each of the plurality of time periods, a given behavior label for a given one of the plurality of time periods being based at least in part on measured feature values for the plurality of features collectively in the given time period;

generating second modality information for the time series diagnostic data, the second modality information comprising feature deltas characterizing differences between measured feature values for interdependent pairs of the plurality of features in each of the plurality of time periods;

performing multi-modal analysis of the time series diagnostic data to detect behavior patterns in the time series diagnostic data utilizing a machine learning model trained using the first modality information and the second modality information; and initiating at least one remedial action in the information technology infrastructure responsive to detecting an anomalous behavior pattern in the time series diagnostic data.

16. The computer program product of claim 15 wherein generating the second modality information for the time series diagnostic data comprises:

analyzing the time series diagnostic data to generate a feature dependency matrix characterizing interdependencies between pairs of the plurality of features; and identifying the interdependent pairs of the plurality of features based at least in part on the feature dependency matrix.

17. The computer program product of claim 15 wherein a given interdependent pair of the plurality of features comprises a first one of the plurality of features and a second one of the plurality of features, and wherein feature deltas for the given interdependent pair of the plurality of features characterize relative differences between the first feature and the second feature across the plurality of time periods.

18. A method comprising:
- obtaining time series diagnostic data associated with a plurality of assets in an information technology infrastructure, the time series diagnostic data comprising feature values for a plurality of features measured for a plurality of time periods;
- generating first modality information for the time series diagnostic data, the first modality information comprising behavior labels assigned to each of the plurality of time periods, a given behavior label for a given one of the plurality of time periods being based at least in part on measured feature values for the plurality of features collectively in the given time period;
- generating second modality information for the time series diagnostic data, the second modality information comprising feature deltas characterizing differences between measured feature values for interdependent pairs of the plurality of features in each of the plurality of time periods;
- performing multi-modal analysis of the time series diagnostic data to detect behavior patterns in the time series diagnostic data utilizing a machine learning model trained using the first modality information and the second modality information; and
- initiating at least one remedial action in the information technology infrastructure responsive to detecting an anomalous behavior pattern in the time series diagnostic data;
- wherein the method is performed by at least one processing device comprising a processor coupled to a memory.

19. The method of claim 18 wherein generating the second modality information for the time series diagnostic data comprises:
- analyzing the time series diagnostic data to generate a feature dependency matrix characterizing interdependencies between pairs of the plurality of features; and
- identifying the interdependent pairs of the plurality of features based at least in part on the feature dependency matrix.

20. The method of claim 18 wherein a given interdependent pair of the plurality of features comprises a first one of the plurality of features and a second one of the plurality of features, and wherein feature deltas for the given interdependent pair of the plurality of features characterize relative differences between the first feature and the second feature across the plurality of time periods.

* * * * *